United States Patent
Wan et al.

(10) Patent No.: US 11,491,444 B2
(45) Date of Patent: Nov. 8, 2022

(54) PREPARATION AND APPLICATION OF IN-SITU HIGH EFFICIENT DEGRADATION CARBON BASED MATERIALS OF VOCS IN LANDFILL BASED ON WASTE RECYCLING

(71) Applicant: INSTITUTE OF ROCK AND SOIL MECHANICS, CHINESE ACADEMY OF SCIENCES, Wuhan (CN)

(72) Inventors: Yong Wan, Wuhan (CN); Lei Liu, Wuhan (CN); Linbo Qin, Wuhan (CN); Jiangshan Li, Wuhan (CN); Yijun Chen, Wuhan (CN)

(73) Assignee: INSTITUTE OF ROCK AND SOIL MECHANICS, CHINESE ACADEMY OF SCIENCES, Wuhan (CN)

( * ) Notice: Subject to any disclaimer, the term of this patent is extended or adjusted under 35 U.S.C. 154(b) by 443 days.

(21) Appl. No.: 16/747,564

(22) Filed: Jan. 21, 2020

(65) Prior Publication Data
US 2020/0261847 A1    Aug. 20, 2020

(30) Foreign Application Priority Data
Feb. 15, 2019   (CN) .......................... 201910030743.6

(51) Int. Cl.
*B01D 53/44*    (2006.01)
*B01D 53/85*    (2006.01)
*B01J 20/20*    (2006.01)

(52) U.S. Cl.
CPC ............. *B01D 53/85* (2013.01); *B01D 53/44* (2013.01); *B01J 20/20* (2013.01); *B01D 2251/95* (2013.01); *B01D 2258/02* (2013.01)

(58) Field of Classification Search
CPC ........ Y02W 30/30; Y10S 423/18; B09B 3/60; B09B 3/70; B01J 20/20; B01D 2258/02; B01D 53/85; B01D 2251/95; B01D 53/44
See application file for complete search history.

(56) References Cited

U.S. PATENT DOCUMENTS 5,529,612 A * 6/1996 Troost ....................... B09B 1/00
                                                              95/227
2015/0239743 A1    8/2015 Despen et al.

FOREIGN PATENT DOCUMENTS

CN           107027541 A        8/2017
CN        107 213 782 A  *     9/2017  ............. B01D 53/84
                    (Continued)

*Primary Examiner* — Timothy C Vanoy
(74) *Attorney, Agent, or Firm* — Platinum Intellectual Property LLP (57) ABSTRACT

The invention discloses a preparation method and application of in-situ high-efficiency degradation carbon based material of VOCs in landfill based on waste regeneration, which comprises the following steps: air drying the agricultural and forestry wastes to a moisture content of 0.001 wt %~20 wt %, and the agricultural and forestry wastes mainly include: straw, wheat straw, leaves, branches, weeds, crushing them to a particle size of 0-50 mm with a grinder, and then using urea or amide as modifier The nitrogen enriched biochar was prepared by mixing the crushed agricultural and forestry wastes with a mass ratio of 1:50-1:10; the nitrogen enriched biochar was prepared by retorting the nitrogen doped agricultural and forestry wastes at 300-600° C. for 20-60 min, and then cooling them rapidly; the nitrogen enriched biochar was mixed with the sewage sludge with a moisture content of 90-98 wt. % with a weight ratio of 20:1-10:1 to get the nitrogen enriched microorganism The degradation efficiency of TVOCs in landfill is 96.74%~99.70%.

7 Claims, 10 Drawing Sheets

(56) References Cited

FOREIGN PATENT DOCUMENTS

| CN | 107382603 A | | 11/2017 | | |
|---|---|---|---|---|---|
| CN | 109012589 A | | 12/2018 | | |
| CN | 111 362 265 A | * | 7/2020 | ........ | B01J 20/28064 |

* cited by examiner

PREPARATION AND APPLICATION OF IN-SITU HIGH EFFICIENT DEGRADATION CARBON BASED MATERIALS OF VOCS IN LANDFILL BASED ON WASTE RECYCLING

RELATED APPLICATIONS

This application is a Non-provisional Application under 35 USC 111(a), which claims Chinese Patent Application Serial No. CN201910030743.6, filed Feb. 15, 2019, the disclosure of all of which are hereby incorporated by reference in their entirety.

Technical Field

The invention belongs to the technical field of VOCs degradation materials, and more particularly relates to a preparation method and application of in-situ high-efficiency degradation carbon based materials of VOCs in landfill based on waste regeneration.

BACKGROUND TECHNOLOGY

Volatile organic compounds (VOCs) refer to the general term of volatile organic compounds whose melting point is lower than room temperature and boiling point is between 50-260° C., mainly including non methane fatty hydrocarbons, aromatic compounds, oxygen-containing organic compounds, chlorine containing organic compounds, nitrogen-containing organic compounds and sulfur-containing organic compounds. VOCs are important precursors of secondary aerosols and ozone ($O_3$), which are easy to cause air pollution problems such as haze, greenhouse effect, photochemical smog and ozone layer damage. Some VOCs are carcinogenic, teratogenic, mutagenic and bioaccumulative. VOCs can be divided into natural sources and man-made sources, of which man-made sources cause the most serious pollution. In 2016, the total emission of VOCs from human sources in China reached 31.12 million tons. By 2020, the total VOCs emission in key areas and industries will be reduced by more than 10%.

Landfill is one of the most important sources of VOCs. During the whole process of landfilling, covering, sealing and stabilization, a large amount of landfill gas is produced in the process of aerobic decomposition, anaerobic decomposition, anaerobic decomposition and stable gas production. In addition to methane ($CH_4$, 50-60 vol. %) and carbon dioxide ($CO_2$, 40-50 vol. %), landfill gas also contains $NH_3$, $SO_2$, $H_2S$ and a variety of volatile organic pollutants (VOCs, 1-2 vol. %). In 2016, the harmless treatment capacity of domestic waste in China reached 197 million tons, including 119 million tons of landfill treatment, and about 2.2 million tons of VOCs escaped into the atmosphere during the landfill treatment process. VOCs Pollution in the landfill area belongs to the open unorganized emission non-point source, which has a large amount, scattered distribution, long duration, wide range of influence, and very difficult collection, resulting in more complex environmental behavior of VOCs pollutants. In recent years, some domestic landfills are gradually surrounded by residential areas. VOCs odor disturbing incidents frequently occur in Beijing, Nanjing, Shanghai, Guangzhou, Hangzhou and other urban landfills, which directly threaten the living environment and physical and mental health of residents around the landfill, and has become a constraint factor in the application of landfill treatment technology.

At present, VOCs degradation in landfill mainly adopts the method of in-situ biodegradation, that is, based on the strong decomposition ability and rapid propagation characteristics of microorganisms, using the microbial community gathered in the covering material to decompose VOCs and inorganic odor components produced in the anaerobic fermentation process of landfill. The landfill cover not only inhibited the volatilization of VOCs, but also increased the contact space between microorganisms and VOCs. The technology of in-situ degradation of VOCs in landfill overburden has the advantages of in-situ treatment, source control, simple process and convenient operation. However, the removal effect of VOCs by in-situ Biodegradation Technology in landfill is affected by covering materials, VOCs types, microbial types and environmental factors. The selection of covering materials directly determines the effect and economy of in-situ degradation of VOCs. At present, due to the limitation of specific surface area, pore structure and adsorption performance, the traditional clay and topsoil can only degrade 30-50% VOCs, which can not fundamentally solve the problem of VOCs Pollution in landfill Therefore, it is the development direction of in-situ Biodegradation Technology of VOCs in landfill to develop an economic overburden material with large porosity, strong gas adsorption capacity and large microbial load.

Agricultural and forestry waste is a kind of renewable bioenergy. According to statistics, about 700 million tons of agricultural and forestry wastes are produced every year in China. Traditional on-site incineration treatment is easy to lead to haze and is prohibited. Composting method is easy to lead to odor pollution and is limited. Biochar, pyrolysis oil and pyrolyzed gas produced by the dry distillation of agricultural and forestry wastes are another way of resource utilization of agricultural and forestry wastes. Biochar prepared from agricultural and forestry wastes is characterized by large specific surface area, developed pore structure and strong gas adsorption capacity. Activated sludge is the main by-product of sewage treatment process, which has the characteristics of strong microbial carrying capacity. If the large specific surface area and strong gas adsorption capacity of waste pyrolysis carbon are organically combined with the activated sludge with strong microbial carrying capacity, an economic covering material with large specific surface area, developed pore structure, strong gas adsorption capacity and large microbial carrying capacity can be prepared, which is expected to achieve efficient in-situ biodegradation of VOCs in landfill.

SUMMARY OF THE INVENTION

The purpose of the invention is to provide a kind of in-situ high-efficiency landfill cover material for VOCs degradation based on waste regeneration. The material is rich in microorganisms, nitrogen sources and carbon sources, which is conducive to microbial reproduction. The material has large specific surface area, developed pores, high VOCs adsorption capacity and easy degradation. Another purpose of the invention is to provide a landfill based on waste regeneration The preparation method of in-situ high-efficiency degradation carbon based materials for field VOCs is to prepare a kind of microbial rich nitrogen biochar from agricultural and forestry wastes and sewage sludge by directional control of pore structure and specific surface chemical properties. The method has the advantages of simple preparation process, low preparation cost, large specific surface area, developed pore diameter and micro size The invention also aims to provide an application of a preparation method for in-situ high-efficiency degradation of carbon based materials in landfill based on waste regeneration. The porous materials loaded with microorganisms are used to cover the landfill area, absorb VOCs emitted by volatilization, degrade them into harmless gas, and realize the purpose of waste treatment.

The technical scheme of the invention: a preparation method of in-situ high-efficiency degradation carbon based material of VOCs in landfill based on waste regeneration, which comprises the following steps:

S01. Pretreatment of raw materials: air dry the agricultural and forestry wastes to a moisture content of 0.001 wt %~20 wt %, and crush them to a particle size of 0~50 mm with a grinder. Then mix the organic nitrogen as a modifier with the crushed agricultural and forestry wastes in a mass ratio of 1:50~1:10 to uniformly prepare the agricultural and forestry wastes mixed with nitrogen;

S02. Distill the nitrogen doped agricultural and forestry wastes prepared in step S01 at 300~600° C. for 20~60 min, and then rapidly cool them to prepare nitrogen rich biochar;

S03. Preparation of nitrogen rich biochar rich in microorganisms: the nitrogen rich biochar obtained in step SO2 was mixed evenly with sewage sludge with water content of 90-98 wt % in the proportion of 20:1-10:1 by weight to prepare nitrogen rich biochar rich in microorganisms;

S04. In situ degradation of VOCs in landfill site by microbial rich N-rich biochar: replace part of clay cover with microbial rich N-rich biochar obtained in step S03;

The preparation method includes straw, wheat straw, leaves, branches and weeds.

The preparation method, wherein the organic nitrogen modifier in step S01 is urea or amide.

The sewage sludge in the step S03 is the activated sludge rich in microorganisms produced in the process of municipal domestic sewage or industrial sewage treatment.

The preparation method comprises non methane nutritious bacteria, methane nutritious bacteria type I, methane nutritious bacteria type II, aerobic heterotrophic bacteria, actinomycetes, fungi, sulfur oxidizing bacteria, sulfate reducing bacteria and other microorganisms.

The above-mentioned preparation method, in the step S04, the agricultural and forestry waste mixed with nitrogen is prepared by mixing the organic nitrogen as modifier and the crushed agricultural and forestry waste in the proportion of 1:50-1:10 by mass.

The preparation method described above, wherein the microbial rich nitrogen-rich biochar in step S04 replaces the clay covering layer with a thickness of 10-30%.

The steps of the application of the preparation method are as follows:

Air dry the agricultural and forestry wastes to a moisture content of 0.001 wt %~20 wt %. The agricultural and forestry wastes are mainly: straw, wheat straw, leaves, branches and weeds, which are crushed to a particle size of 0~50 mm by a grinder, and then mix urea or amide as modifier with the crushed agricultural and forestry wastes in a ratio of 1:50~1:20 to prepare the agricultural and forestry wastes mixed with nitrogen evenly; and then mix the agricultural and forestry wastes mixed with nitrogen into the agricultural and forestry wastes The biomass was carbonized at 300-600° C. for 20-60 min, and then rapidly cooled to prepare nitrogen rich biochar. After the nitrogen rich biochar and sewage sludge with water content of 90-98 wt % were mixed evenly according to the weight ratio of 20:1-10:1, the nitrogen rich biochar rich in microorganism was prepared. The nitrogen rich biochar rich in microorganism was replaced by clay layer with thickness of 10-30%, and the degradation efficiency of TVOCs in landfill was 96.74%-99.70%. Compared with the prior art, the invention has the following beneficial effects:

(1) the invention takes agricultural and forestry wastes and sewage sludge as raw materials, through mixing agricultural and forestry wastes with organic nitrogen modifier and dry distillation, and through sewage sludge conditioning and loading microorganisms to prepare nitrogen rich biochar rich in microorganisms, which has the characteristics of low price of raw materials, wide sources and simple preparation process. The organic nitrogen modifier can be added into agricultural and forestry wastes, and can be used in agricultural and forestry wastes In the process of waste material retorting, nitrogen source is provided for microorganism reproduction and growth, sewage sludge is added into the nitrogen rich biochar, which can be loaded with rich microorganisms, and microorganisms can reproduce in the nitrogen rich biochar. The nitrogen rich biochar prepared by the invention has the advantages of simple preparation process, low preparation cost, large specific surface area and developed pore diameter, and microbial bearing capacity High loading capacity and high VOCs degradation efficiency.

(2) the organic nitrogen modification of agricultural and forestry wastes can improve the specific surface area and pore size distribution of carbon based adsorbent, and then improve the adsorption performance of carbon based adsorbent on VOCs; ② change the surface chemical properties of carbon based adsorbent, improve the polarity of carbon based adsorbent, and further improve the adsorption performance of carbon based adsorbent on VOCs, because most VOCs are polar; ③ improve the adsorption performance of carbon based adsorbent on VOCs With high nitrogen content of carbon based adsorbent, VOCs are rich in N, C, h, O sources that are conducive to microbial reproduction, because nitrogen is the nutrient of microorganisms, so improving nitrogen content is conducive to microbial reproduction.

(3) agricultural and forestry wastes are usually directly burned to form haze, while sewage sludge is the main by-product of wastewater treatment process, which is usually directly landfilled. The nitrogen rich biochar made by the invention is used for in-situ biodegradation of VOCs in landfill to achieve the goal of "turning waste into treasure".

(4) the in-situ degradation efficiency of VOCs by traditional clay cover is only 30-60%. When nitrogen rich biochar rich in microorganisms replaces 10-30% clay layer, the degradation efficiency of TVOCs in landfill is increased to 96.74-99.70%.

SPECIFIC IMPLEMENTATION MODE

The invention will be further described in combination with the embodiments, but it will not be taken as the basis for limiting the invention.

Embodiment 1

Take the agricultural and forestry wastes such as straw, wheat straw, leaves, branches, weeds and so on as an embodiment, 1000 g of agricultural and forestry wastes dried to 20 wt % of water content are crushed to 0-20 mm by a grinder, preferably 10-20 mm, and then 100 g of urea (5.0 wt % of n added) is evenly mixed with the crushed agricultural and forestry wastes, which are dried at 500° C. for 10-30 min, preferably 20-30 min, and then quickly wet Cool to room temperature to obtain 440 g of nitrogen rich biochar.

Embodiment 2

Take the agricultural and forestry wastes such as straw, wheat straw, leaves, branches, weeds and so on as an embodiment, dry 1000 g of agricultural and forestry wastes whose weight is reduced to 20 wt % of water content, and crush them to 0-20 mm, preferably 10-20 mm, with a grinder, then mix 80 g of urea (4.0 wt % of N added) with the crushed agricultural and forestry wastes evenly, dry distillation at 500° C. for 10-30 min, preferably 20-30 min, and isolate the air Then the nitrogen rich biochar 430 g was obtained by wet cooling to normal temperature.

Embodiment 3

Taking straw, wheat straw, leaves, branches, weeds and other agricultural and forestry wastes as an embodiment, 1000 g of agricultural and forestry wastes dried to 20 wt % water content are crushed to 0-20 mm by a grinder, preferably 10-20 mm, and then 60 g of urea (3.0 wt % of N added) is mixed with the crushed agricultural and forestry wastes evenly, dried at 500° C. for 30 min, and then rapidly cooled to normal temperature by wet method Nitrogen rich biochar 400 g.

Embodiment 4

Taking straw, wheat straw, leaves, branches, weeds and other agricultural and forestry wastes as embodiments, 1000 g of agricultural and forestry wastes dried to 20 wt % of water content were crushed to 0-20 mm by a grinder, preferably 10-20 mm, and then 40 g of urea (2.0 wt % of N added) was mixed evenly with the crushed agricultural and forestry wastes, which were dried at 500° C. for 30 min, then rapidly cooled to normal temperature by wet method Nitrogen rich biochar 420 g.

Embodiment 5

Taking straw, wheat straw, leaves, branches, weeds and other agricultural and forestry wastes as an embodiment, 1000 g of agricultural and forestry wastes dried to 20 wt % water content are crushed to 0-20 mm by a grinder, preferably 10-20 mm, and then 20 g of urea (1.0 wt % of N added) is mixed with the crushed agricultural and forestry wastes evenly, dry distilled at 500° C. for 30 min, and then rapidly cooled to normal temperature by wet method Nitrogen rich biochar 420 g.

Embodiment 6

Taking straw, wheat straw, leaves, branches, weeds and other agricultural and forestry wastes as an embodiment, 100 g of agricultural and forestry wastes dried to 20 wt % of water content were crushed to 0-20 mm by a grinder, preferably 10-20 mm, and then dried at 500° C. for 30 min, then rapidly cooled to room temperature by wet method to obtain 443 gg of nitrogen rich biochar.

Bet, SEM, XPS, FTIR and element analyzer were used to characterize the pore structure, surface chemical properties and element analysis of the nitrogen rich biochar or biochar obtained from embodiment 1, 2, 3, 4, 5 and 6. The results are shown in Table 1. The effect of the amount of nitrogen doping agent on the specific surface area, pore structure and element composition of the carbon based coating material.

TABLE 1

| Embodiment | N/wt % | $S_{BET}^a$ $m^2/g$ | $V_0^b$ $cm^3/g$ | N wt % | C wt % | H wt % |
|---|---|---|---|---|---|---|
| 6 | 0 | 32 | 0.023 | 0.81 | 83.16 | 1.74 |
| 5 | 1.0 | 851 | 0.442 | 0.82 | 87.00 | 0.97 |
| 4 | 2.0 | 927 | 0.479 | 1.76 | 83.26 | 1.27 |
| 3 | 3.0 | 974 | 0.574 | 1.98 | 83.59 | 1.18 |
| 2 | 4.0 | 924 | 0.531 | 1.98 | 83.02 | 1.16 |
| 1 | 5.0 | 945 | 0.487 | 1.99 | 84.19 | 1.12 |

Figure 1:
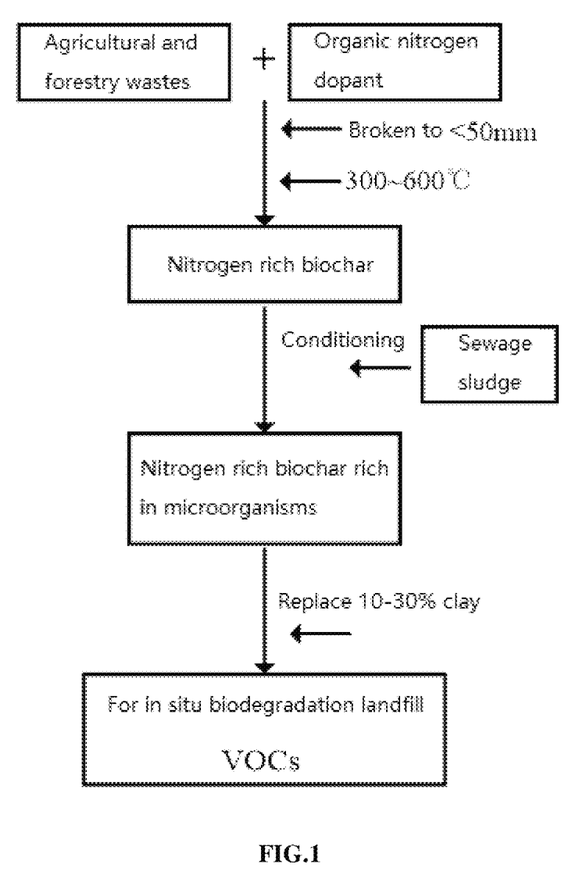
FIG. 1 is a step diagram of the implementation process of the invention.
Figure 2:
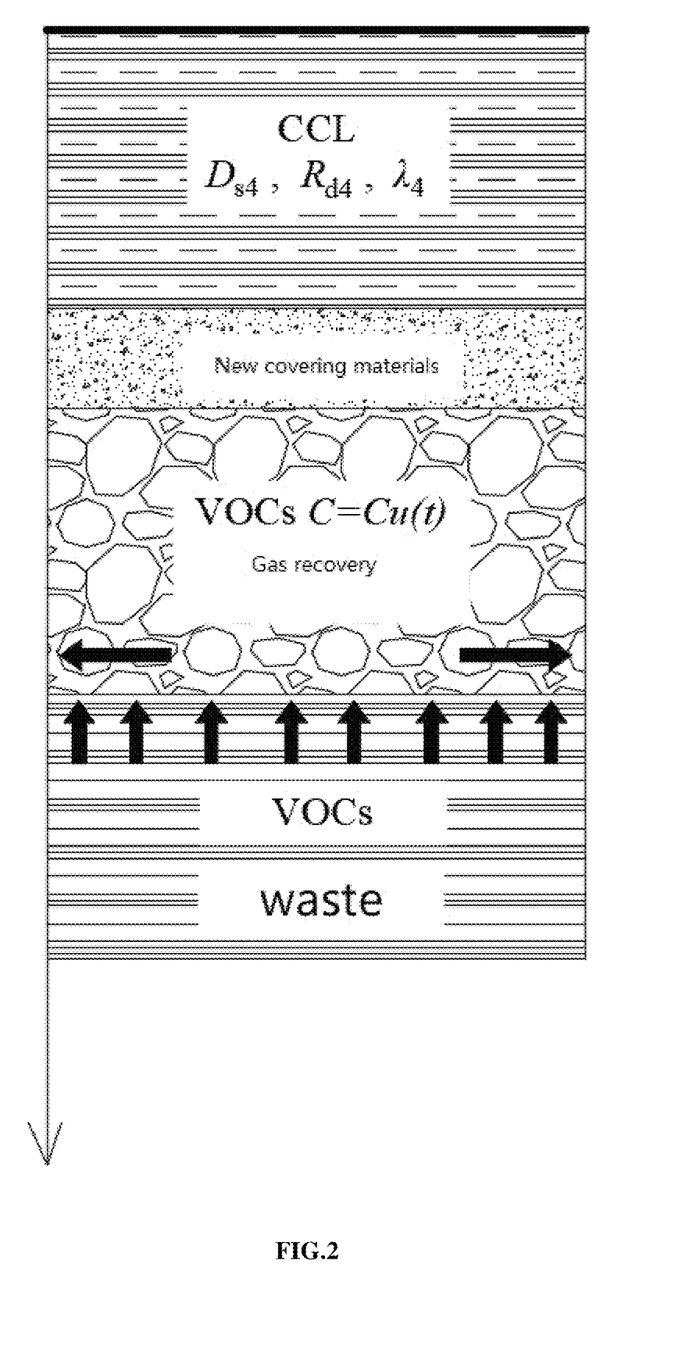
FIG. 2 is a schematic diagram of the structure of the VOCs new field sealing cover of the in-situ degradation landfill of the invention.
Figure 3:
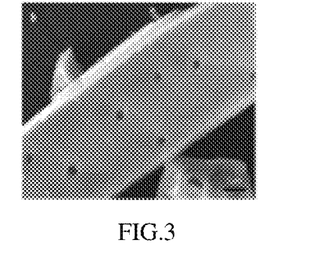
FIG. 3 is the microscopic diagram of biochar obtained in embodiment 6 when the magnification is 1 μm by scanning electron microscope.
Figure 4:
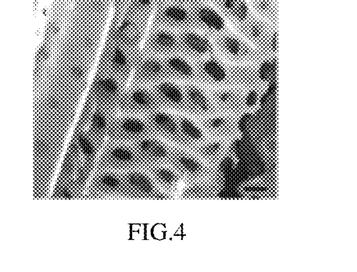
FIG. 4 is the microscopic diagram of the nitrogen-doped modified biochar obtained in embodiment 3 when the magnification is 1 μm by scanning electron microscope.
Figure 5:
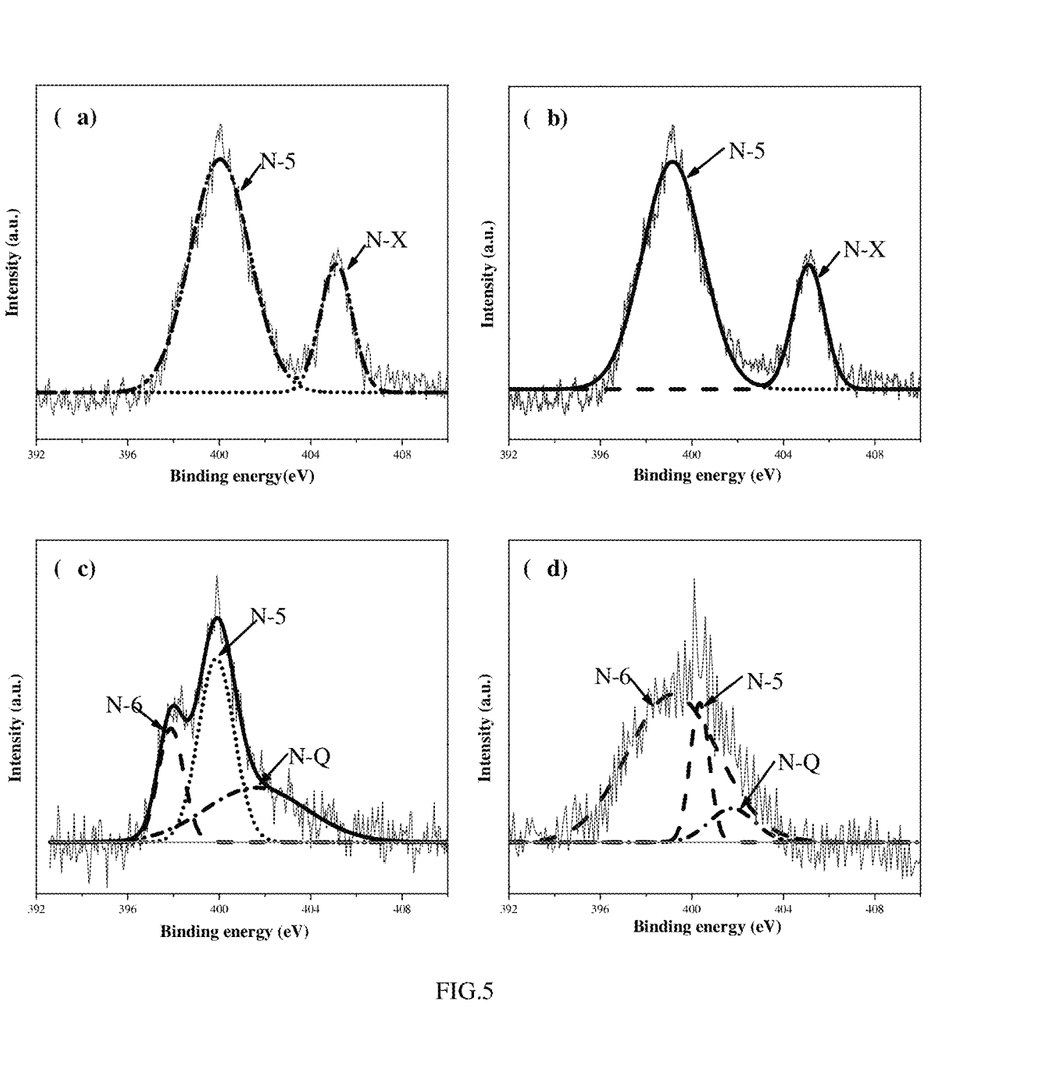
FIG. 5 is a spectrum obtained by XPS n1s spectrum analysis of materials prepared in embodiment 6, embodiment 5, embodiment 3, embodiment 1 and embodiment 2.
Figure 6:
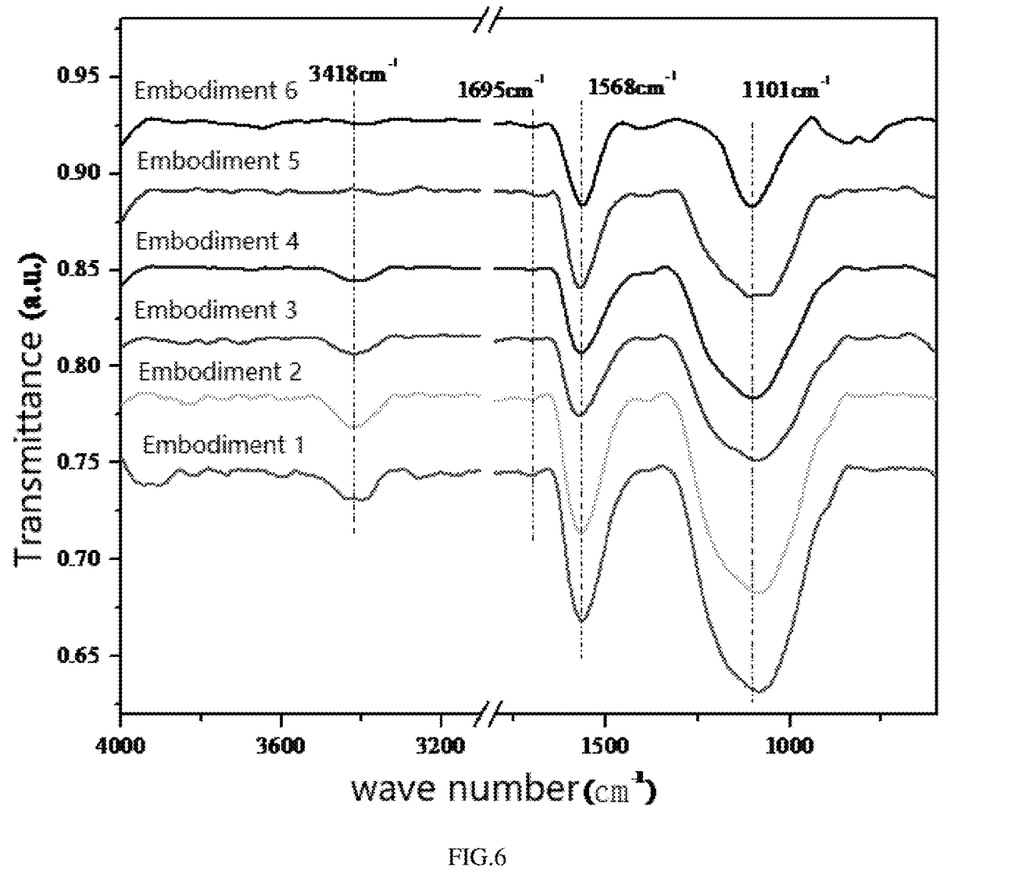
FIG. 6 is the spectrum obtained from infrared spectrum analysis of the materials prepared in embodiments 1 to 6.

The biochar or nitrogen rich biochar obtained in embodiment 6 and embodiment 3 were observed by scanning electron microscope, as shown in FIG. 3 and FIG. 4, respectively, with magnification of 1 μM. after the modification of mixed urea, the mesopore size became larger and the distribution was more uniform, as shown in FIGS. 5a, 5b, 5C and 5D, respectively, for XPS n1s of the carbon based coating material prepared in embodiment 6, embodiment 5, embodiment 3, embodiment 1 and embodiment 2 Spectrum analysis results. As shown in FIG. 5C, in embodiment 3, n1s peak appears on the attachment of 398 ev and 400.1 ev and 402 ev. The surface of the carbon based coating material is successfully doped with nitrogen atoms. 398 ev is equivalent to pyridine structure nitrogen, i.e. pyridine nitrogen (n-6), 400.1 ev is equivalent to pyrrole/pyridinone structure nitrogen (N-5), 402 ev is equivalent to graphite type nitrogen (n-q). In embodiment 3, the amount of nitrogen doping on the surface of carbon based coating material is 1.98% of the mass fraction of carbon based coating material. FIG. 5 combined with FIG. 6, infrared spectrum analysis of carbon based coating material shows that the peak value of nitrogen-containing functional groups on the surface of carbon based coating material after nitrogen doping modification is more obvious, and the content of nitrogen-containing functional groups is significantly increased.

Figure 7:
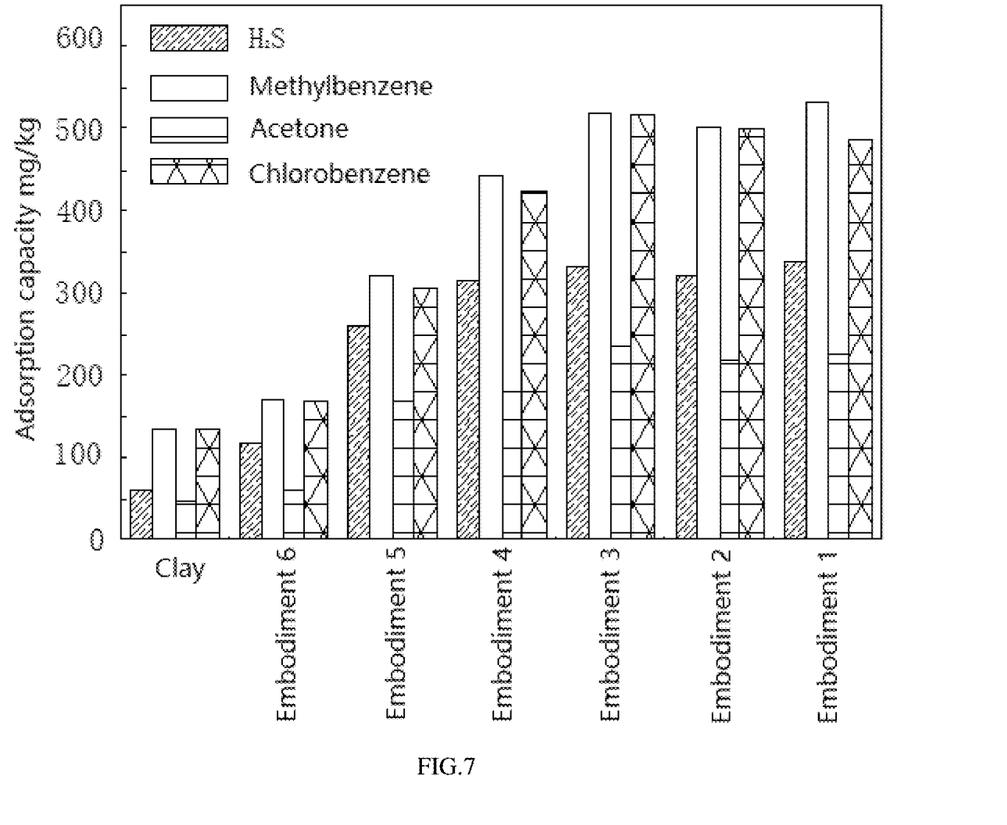
FIG. 7 is the histogram of adsorption capacity of embodiment 1-6 and clay for VOCs simulation gas.
Figure 8:
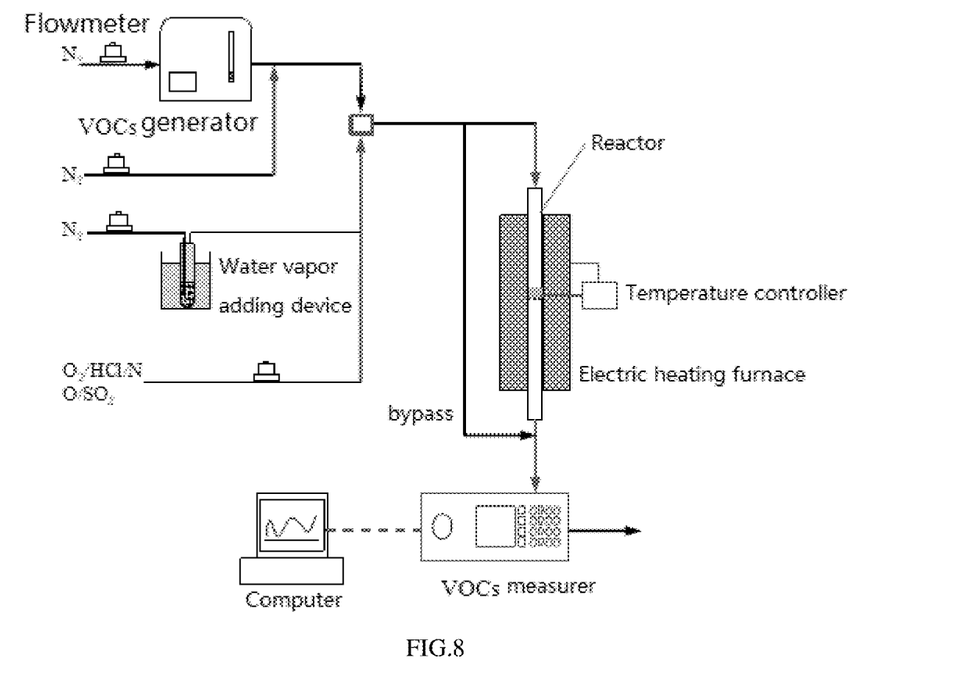
FIG. 8 is the structural diagram of the test device for the adsorption capacity test described in FIG. 7.

As shown in FIG. 8, nitrogen rich biochar (embodiments 5-1) and traditional clay and biochar (embodiment 6) are filled into a glass reaction tube, and simulation gas containing VOCs is input into the reaction tube. The flow rate of simulation gas is 150 ml/min; the concentration of VOCs in the simulation gas is 400 mg/m3; the reaction tube is insulated at 30° C. As shown in FIG. 7, the results of VOCs adsorption capacity using nitrogen rich biochar (embodiments 5-1) and traditional clay and biochar (embodiment 6) show that the adsorption performance of the materials in embodiments 5-1 is significantly better than that of clay, and the adsorption performance of the materials in embodiment 3 is the best, and the adsorption capacity of typical VOCs is about 5 times that of traditional clay. When the mass ratio of organic nitrogen to agricultural and forestry wastes is 3.0~5.0 wt %, the adsorption effect of biochar modified by nitrogen on VOCs is the best.

Embodiment 7

Application of Carbon Based Coating Material in Embodiment 6

Then 0.5 kg of sewage or sludge with water content of 90-98 wt. % was sprayed on 5 kg of biochar in embodiment 6 and cultured in greenhouse for 60 days. The quantity of microorganism contained in biochar is shown in Table 2.

TABLE 2

| In a gram of dry basis sample the number of bacterial colonies on the surface Number | Training time (days) | | | | | | | | | | | |
|---|---|---|---|---|---|---|---|---|---|---|---|---|
| (log CFU g DW.$^{-1}$) | 5 | 10 | 15 | 20 | 25 | 30 | 35 | 40 | 45 | 50 | 55 | 60 |
| Non methane trophic bacteria | 5.4 | 6.8 | 8.3 | 9.2 | 10.8 | 10.1 | 11.3 | 11.9 | 10.8 | 10.4 | 9.8 | 9.2 |
| Methanogen-I | 3.1 | 5.3 | 6.9 | 7.8 | 8.4 | 7.7 | 8.3 | 9.1 | 9.3 | 8.9 | 8.7 | 8.4 |
| Methanogen-II | 2.8 | 3.3 | 4.1 | 5.1 | 5.6 | 6.1 | 6.2 | 5.7 | 5.6 | 5.2 | 5.4 | 5.7 |
| Aerobic heterotrophic bacteria | 6.1 | 8.1 | 9.5 | 9.7 | 9.4 | 9.6 | 9.5 | 9.3 | 9.3 | 8.7 | 8.2 | 7.5 |
| Actinomycetes | 2.2 | 3.7 | 5.1 | 6.4 | 6.1 | 5.3 | 5.1 | 4.9 | 5.3 | 4.6 | 4.5 | 4.1 |
| Fungus | 3.8 | 4.7 | 5.3 | 6.3 | 6.1 | 6 | 5.8 | 5.3 | 4.9 | 5.2 | 4.7 | 4.6 |
| Sulfur oxidizing bacteria | 1.4 | 1.55 | 1.68 | 1.98 | 2.17 | 2.56 | 2.34 | 2.55 | 2.11 | 2.01 | 2.12 | 1.87 |
| Sulfate reducing bacteria | 1.34 | 1.67 | 1.98 | 2.34 | 2.89 | 2.56 | 2.11 | 2.34 | 2.56 | 2.05 | 1.9 | 2.05 |

Embodiment 8

Then 5 kg clay was taken and cultured in greenhouse for 60 days. See Table 3 for the number of microorganisms in the clay.

TABLE 3

| In a gram of dry basis sample the number of bacterial colonies on the surface Number | Training time (days) | | | | | | | | | | | |
|---|---|---|---|---|---|---|---|---|---|---|---|---|
| (log CFU g DW.$^{-1}$) | 5 | 10 | 15 | 20 | 25 | 30 | 35 | 40 | 45 | 50 | 55 | 60 |
| Non methane trophic bacteria | 7.6 | 8.1 | 8.3 | 8.1 | 8.5 | 8.6 | 7.8 | 7.5 | 7.1 | 6.9 | 6.1 | 6.4 |
| Methanogen-I | 5.2 | 5.8 | 6.3 | 6.1 | 6.6 | 6.2 | 5.4 | 5.1 | 5.1 | 5.3 | 5.4 | 5.1 |
| Methanogen-II | 4.6 | 4.4 | 4.3 | 4.5 | 4.1 | 3.9 | 3.8 | 3.9 | 4.2 | 4.4 | 4.1 | 4.03 |
| Aerobic heterotrophic bacteria | 5.2 | 5.7 | 6.2 | 6.9 | 7.3 | 7.2 | 7.1 | 6.4 | 6.1 | 5.6 | 5.8 | 5.1 |
| Actinomycetes | 3.2 | 3.7 | 3.6 | 4.1 | 4.3 | 3.8 | 3.5 | 3.2 | 3.7 | 3.5 | 3.4 | 3.2 |
| Fungus | 3.1 | 4.1 | 4.2 | 4.8 | 4.2 | 4.3 | 4.1 | 3.9 | 3.2 | 3.3 | 2.9 | 2.8 |
| Sulfur oxidizing bacteria | 3.12 | 3.3 | 3.11 | 3.25 | 3.1 | 2.98 | 2.56 | 2.44 | 2.11 | 1.98 | 1.56 | 1.58 |
| Sulfate reducing bacteria | 2.58 | 3.12 | 3.48 | 3.85 | 3.78 | 3.69 | 3.54 | 3.35 | 3.14 | 3.05 | 3.11 | 2.18 |

Embodiment 9

Application of Carbon Based Coating Material in Embodiment 1

Then 0.5 kg of sewage or sludge with water content of 90-98 wt. % was sprayed on 5 kg of nitrogen rich biochar in embodiment 1 and cultured in greenhouse for 60 days. See Table 4 for the number of microorganisms in the nitrogen doped modified biochar.

TABLE 4

| In a gram of dry basis sample the number of bacterial colonies on the surface Number | Training time (days) | | | | | | | | | | | |
|---|---|---|---|---|---|---|---|---|---|---|---|---|
| (log CFU g DW.$^{-1}$) | 5 | 10 | 15 | 20 | 25 | 30 | 35 | 40 | 45 | 50 | 55 | 60 |
| Non methane trophic bacteria | 11.3 | 11.9 | 12.4 | 13.1 | 13.5 | 12.7 | 13.8 | 12.1 | 10.9 | 11.5 | 11.9 | 11.2 |
| Methanogen-I | 7.1 | 7.3 | 8.5 | 8.8 | 9.1 | 8.6 | 9.4 | 10.1 | 9.3 | 9.1 | 8.9 | 8.6 |
| Methanogen-II | 6.7 | 7.3 | 8.1 | 8.8 | 9.6 | 8.5 | 8.1 | 7.6 | 6.5 | 6.3 | 5.9 | 6.4 |
| Aerobic heterotrophic bacteria | 8.9 | 9.1 | 10.4 | 10.7 | 11.5 | 12.6 | 13.5 | 12.3 | 11.8 | 10.3 | 9.6 | 9.8 |
| Actinomycetes | 5.3 | 5.7 | 6.3 | 6.9 | 6.4 | 5.9 | 5.8 | 5.7 | 5.7 | 5.2 | 5.1 | 4.9 |
| Fungus | 4.7 | 5.3 | 5.9 | 6.8 | 6.4 | 6.5 | 6.1 | 5.9 | 5.4 | 4.9 | 4.5 | 4.4 |
| Sulfur oxidizing bacteria | 2.34 | 2.55 | 2.78 | 2.87 | 2.67 | 2.67 | 2.43 | 2.2 | 2.34 | 2.11 | 2.23 | 2.03 |
| Sulfate reducing bacteria | 2.67 | 2.89 | 3.11 | 3.43 | 4.13 | 4.54 | 3.98 | 3.54 | 3.01 | 2.53 | 2.16 | 2.11 |

It can be seen from table 4, table 2 and table 3 that the use of nitrogen modified biochar loaded microorganisms can significantly promote bacterial reproduction within 30 days at the initial stage of culture. After 30 days of culture, the number of bacteria decreased gradually because there was no external nutrition supplement.

Embodiment 10

Application of Carbon Based Coating Material in Embodiment 3

Then 0.5 kg of sewage or sludge with water content of 90-98 wt. % was sprayed on 5 kg of nitrogen rich biochar in embodiment 3 and cultured in greenhouse for 60 days.

Embodiment 11

Figure 9:
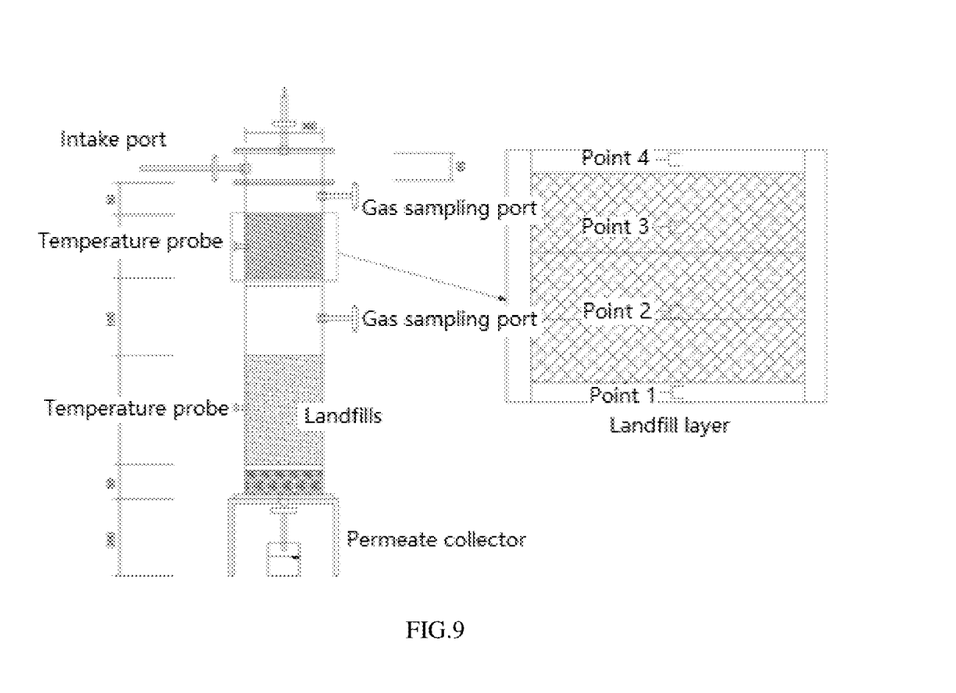
FIG. 9 is the structure diagram of the test device for the VOCs degradation effect test of embodiments 1-6 and clay loaded microorganism.
Figure 10:
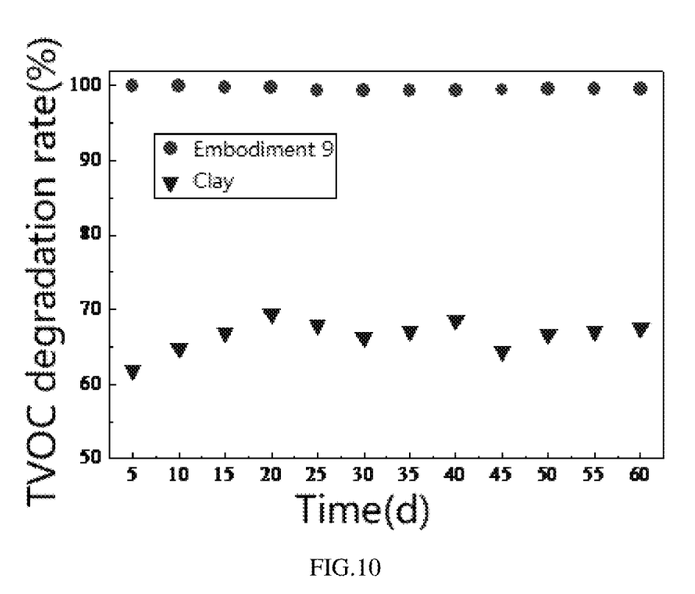
FIG. 10 is the TVOC degradation effect diagram of VOCs degradation by materials and clays of embodiment 9.
Figure 11:
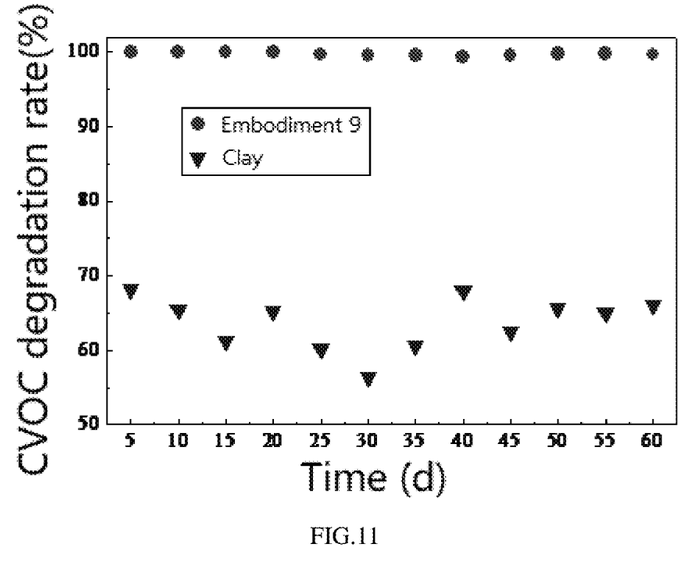
FIG. 11 shows the cvoc degradation effect of the material and clay of embodiment 9 on VOCs degradation.
Figure 12:
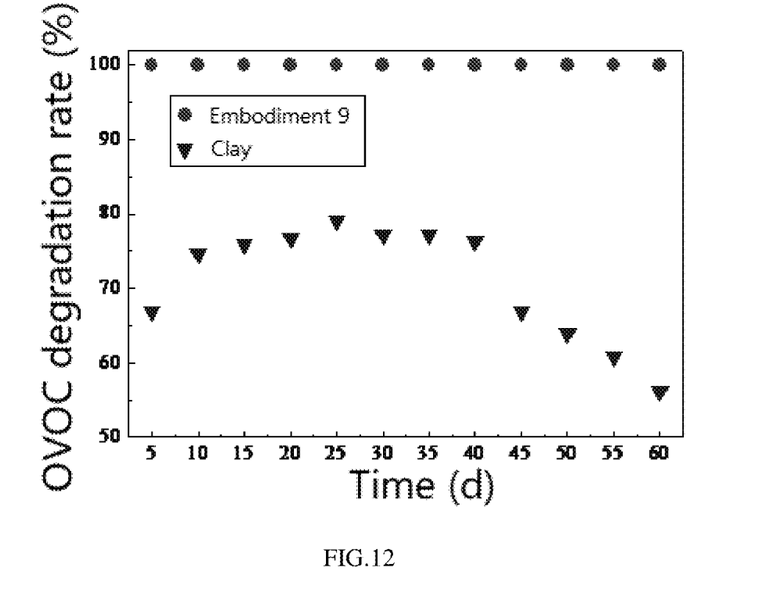
FIG. 12 is an ovoc degradation effect diagram of VOCs degradation by materials and clays of embodiment 9.
Figure 13:
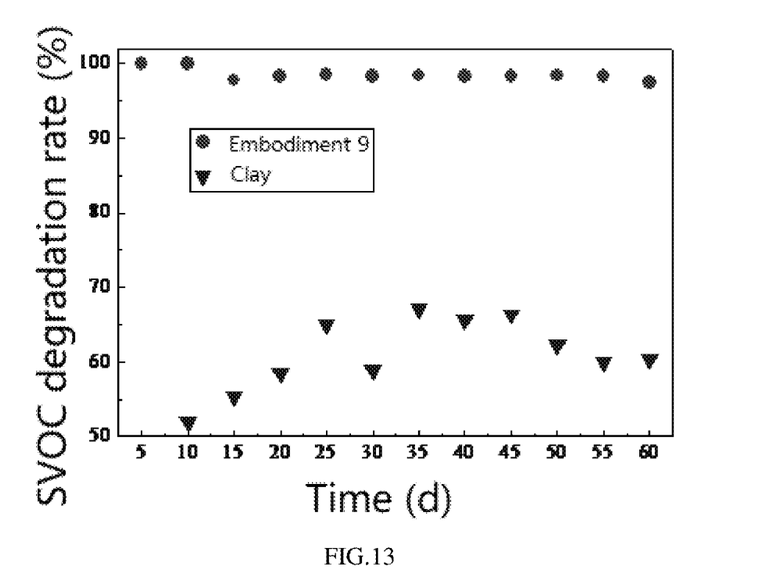
FIG. 13 is an effect diagram of SVOC degradation of VOCs by materials and clays of embodiment 9.
Figure 14:
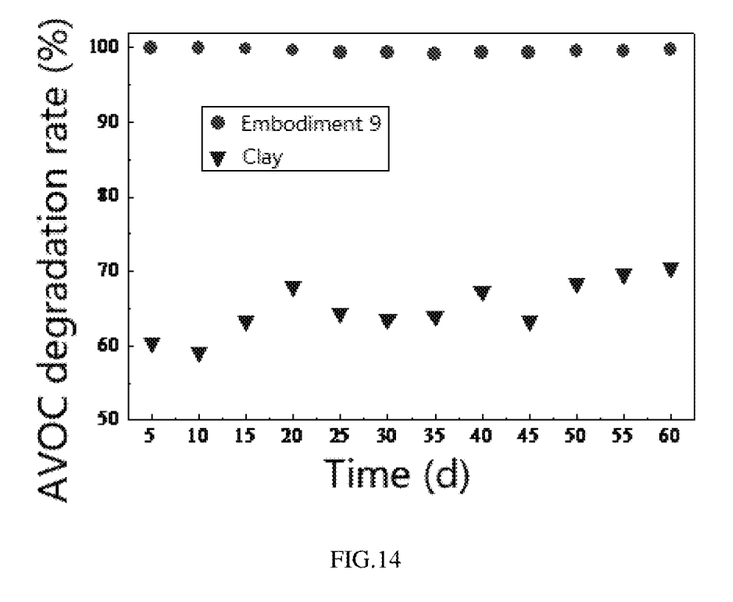
FIG. 14 is an AVOC degradation effect diagram of VOCs degradation by materials and clays of embodiment 9.
Figure 15:
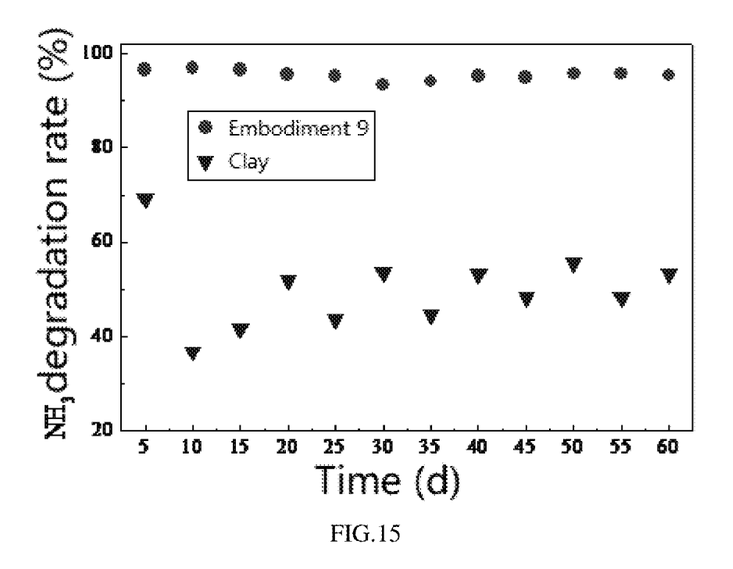
FIG. 15 is the degradation effect diagram of material and clay of embodiment 9 on $NH_3$ degradation.
Figure 16:
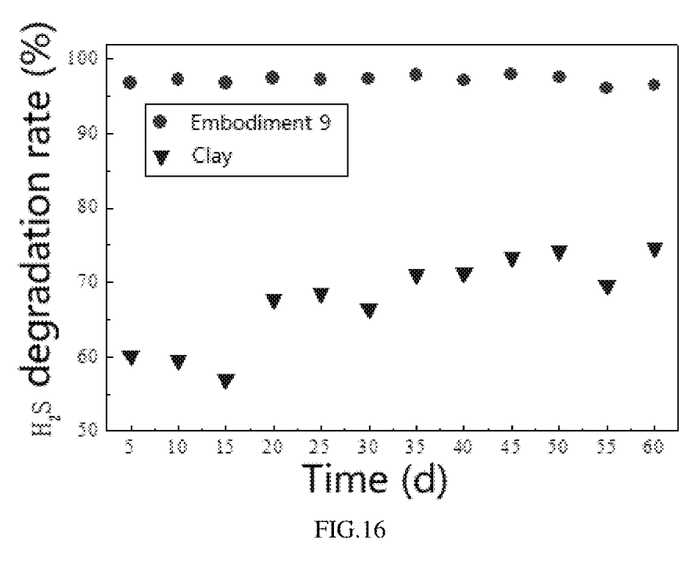
FIG. 16 is the degradation effect diagram of material and clay of embodiment 9 on $H_2S$ degradation.

The in-situ biodegradation performance of VOCs in Embodiment 7 was studied. The materials, garbage and sand in Embodiment 7 were successively filled into the device in FIG. 9 from high to low. The material filling thickness in Embodiment 7 was 300 mm, the garbage density was 920 kg/m3, the water content was 32.64%; the clay density was 1830 kg/m3, the water content was 15.27%; the sand density was 1950 kg/m3, the water content was 2.14%, and the sand was covered in the bottom layer. The in-situ biodegradation of VOCs by the material of embodiment 7 was compared with the soil column test device as shown in FIG. 9. Four measuring points are set in the soil column to measure the temperature: measuring point 1 is the lowest measuring point; measuring point 2 is the place with a landfill depth of 100 mm; measuring point 3 is the place with a landfill depth of 200 mm; measuring point 4 is the place with a landfill depth of 300 mm (i.e. the surface of the overburden). The VOCs generated by landfill waste and the VOCs concentration after filtration of the material in Embodiment 7 are collected. After 60 days of test, TVOC (total VOC), cvoc (chlorine VOC), ovoc are analyzed See Table 5 for the filtered concentration results of (oxygen VOC), SVOC (sulfur VOC) and AVOC (aromatic VOC).

TABLE 5

| | | unit ppb | | | | | | |
|---|---|---|---|---|---|---|---|---|
| Name | Days | 5 | 10 | 15 | 20 | 25 | 30 | 35 |
| TVOCs | Point 1 | 3658 | 8569 | 11582 | 15896 | 18650 | 19865 | 23512 |
| | Point 2 | 2862 | 6140 | 7130 | 9580 | 12202 | 12084 | 13621 |
| | Point 3 | 2031 | 3853 | 4179 | 6303 | 7235 | 7409 | 7537 |
| | Point 4 | 1256 | 2145 | 2698 | 2746 | 2235 | 1568 | 1350 |
| CVOC | Point 1 | 792 | 1979 | 3402 | 5266 | 5993 | 7030 | 5837 |
| | Point 2 | 680 | 1573 | 2267 | 3822 | 4300 | 4854 | 3479 |
| | Point 3 | 540 | 1024 | 1306 | 2313 | 2325 | 2412 | 1857 |
| | Point 4 | 310 | 580 | 880 | 750 | 721 | 630 | 626.5 |
| OVOC | Point 1 | 1895 | 2986 | 3598 | 4569 | 4125 | 3896 | 3568 |
| | Point 2 | 1460 | 2085 | 2245 | 2685 | 2810 | 2480 | 1920 |
| | Point 3 | 1195 | 1325 | 1545 | 1655 | 1580 | 1490 | 1210 |
| | Point 4 | 655 | 856 | 846 | 750 | 610 | 530 | 412 |
| SVOC | Point 1 | 74 | 116 | 168 | 198 | 277 | 325 | 330 |
| | Point 2 | 59 | 46.3 | 62.85 | 92.05 | 97.95 | 114.5 | 116.1 |
| | Point 3 | 46 | 21.39 | 29.07 | 30.75 | 33.46 | 34.93 | 51.67 |
| | Point 4 | 30 | 41 | 52 | 47 | 36 | 34 | 31 |

TABLE 5-continued unit ppb

| | | | | | | | | |
|---|---|---|---|---|---|---|---|---|
| AVOC | Point 1 | 1629 | 4502 | 7313 | 10543 | 12503 | 14337 | 13341 |
| | Point 2 | 1306 | 3591 | 5623 | 6530 | 7382 | 8274 | 7942 |
| | Point 3 | 1052 | 2491 | 3627 | 3708 | 4691 | 3818 | 4852 |
| | Point 4 | 602 | 1456 | 2144 | 1322 | 855 | 750 | 606 |

| Name | Days | 40 | 45 | 50 | 55 | 60 |
|---|---|---|---|---|---|---|
| TVOCs | Point 1 | 20561 | 16845 | 13589 | 11251 | 10510 |
| | Point 2 | 12018 | 11206 | 9520 | 8018 | 7109 |
| | Point 3 | 6451 | 6159 | 5967 | 4879 | 3829 |
| | Point 4 | 1250 | 1100 | 955 | 689 | 542 |
| CVOC | Point 1 | 5643 | 4125 | 4147 | 4049 | 3922 |
| | Point 2 | 3223 | 2608 | 2571 | 2282 | 2430 |
| | Point 3 | 1621 | 1317 | 1288 | 1291 | 1255 |
| | Point 4 | 536.5 | 315.5 | 312 | 295 | 212 |
| OVOC | Point 1 | 3215 | 2896 | 2158 | 1850 | 1740 |
| | Point 2 | 2084 | 1855 | 1540 | 1190 | 1060 |
| | Point 3 | 1295 | 1195 | 950 | 630 | 560 |
| | Point 4 | 354 | 229 | 195 | 148 | 124 |
| SVOC | Point 1 | 286 | 245 | 236 | 211 | 189 |
| | Point 2 | 99.91 | 77.06 | 74.78 | 66.39 | 61.61 |
| | Point 3 | 45.65 | 37.86 | 34.34 | 21.73 | 24.83 |
| | Point 4 | 25 | 21 | 20 | 19 | 18 |
| AVOC | Point 1 | 11958 | 9126 | 8450 | 8773 | 8506 |
| | Point 2 | 6694 | 6499 | 5007 | 5636 | 4783 |
| | Point 3 | 3762 | 3571 | 2849 | 2439 | 2382 |
| | Point 4 | 598 | 610 | 540 | 535 | 420 |

The degradation efficiency results of embodiment 7 (biochar loaded microorganism without nitrogen modification) of TVOC (total VOC), cvoc (VOC with chlorine), ovoc (VOC with oxygen), SVOC (VOC with sulfur) and AVOC (VOC with aromatics) on the above VOCs are shown in Table 6.

TABLE 6

%

| | | Days | | | | | | | | | | |
|---|---|---|---|---|---|---|---|---|---|---|---|---|
| Name | Material | 5 | 10 | 15 | 20 | 25 | 30 | 35 | 40 | 45 | 50 | 55 | 60 |
| TVOC | Embodiment 7 | 65.66 | 74.97 | 76.71 | 82.73 | 88.02 | 92.11 | 94.26 | 93.92 | 93.47 | 92.97 | 93.88 | 94.84 |
| CVOC | Embodiment 7 | 60.86 | 70.69 | 74.13 | 85.76 | 87.97 | 91.04 | 89.27 | 90.49 | 92.35 | 92.48 | 92.71 | 94.59 |
| OVOC | Embodiment 7 | 65.44 | 71.33 | 76.49 | 83.59 | 85.21 | 86.4 | 88.45 | 88.99 | 92.09 | 90.96 | 92 | 92.87 |
| SVOC | Embodiment 7 | 59.46 | 64.66 | 69.05 | 76.26 | 87 | 89.54 | 90.61 | 91.26 | 91.43 | 91.53 | 91 | 90.48 |
| AVOC | Embodiment 7 | 63.04 | 67.66 | 70.68 | 87.46 | 93.16 | 94.77 | 95.46 | 95 | 93.32 | 93.61 | 93.9 | 95.06 |

Analyze the VOCs concentration after filtering by the material of embodiment 10 or the traditional clay of embodiment 8. Conduct the test for 60 days. Analyze the degradation rates of TVOC (total VOC), cvoc (chlorine VOC), ovoc (oxygen VOC), SVOC (sulfur VOC), AVOC (aromatic VOC), NH2 and H2S by the material of embodiment 10 or the traditional clay of embodiment 8, as shown in Table 7. Embodiment 10 shows the biochar loaded microorganism mixed with 3.0 wt % nitrogen.

TABLE 7 unit %

| | Materials loaded with | Days | | | | | | | | | | |
|---|---|---|---|---|---|---|---|---|---|---|---|---|
| Name | microorganisms | 5 | 10 | 15 | 20 | 25 | 30 | 35 | 40 | 45 | 50 | 55 | 60 |
| TVOC | Embodiment 10 | 100 | 100 | 99.83 | 99.72 | 99.38 | 99.37 | 99.34 | 99.32 | 99.44 | 99.55 | 99.6 | 99.64 |
| | Clay | 61.9 | 64.86 | 66.9 | 69.38 | 67.89 | 66.24 | 67.02 | 68.62 | 64.34 | 66.76 | 67.1 | 67.56 |
| CVOC | Embodiment 10 | 100 | 100 | 100 | 100 | 99.65 | 99.57 | 99.55 | 99.35 | 99.62 | 99.71 | 99.77 | 99.69 |
| | Clay | 68.08 | 65.43 | 61.31 | 65.19 | 60.21 | 56.38 | 60.63 | 68.04 | 62.48 | 65.68 | 64.94 | 66.13 |

TABLE 7-continued unit %

| Name | Materials loaded with microorganisms | Days 5 | 10 | 15 | 20 | 25 | 30 | 35 | 40 | 45 | 50 | 55 | 60 |
|---|---|---|---|---|---|---|---|---|---|---|---|---|---|
| OVOC | Embodiment 10 | 100 | 100 | 100 | 100 | 100 | 100 | 100 | 100 | 100 | 100 | 100 | 100 |
|  | Clay | 66.88 | 74.68 | 75.93 | 76.8 | 79.04 | 77.14 | 77.26 | 76.3 | 66.8 | 64.01 | 60.9 | 56.25 |
| SVOC | Embodiment 10 | 100 | 100 | 97.78 | 98.37 | 98.49 | 98.3 | 98.43 | 98.28 | 98.29 | 98.42 | 98.33 | 97.46 |
|  | Clay | 46.06 | 51.98 | 55.35 | 58.5 | 64.98 | 58.82 | 67.01 | 65.73 | 66.38 | 62.19 | 59.95 | 60.48 |
| AVOC | Embodiment 10 | 100 | 100 | 99.91 | 99.7 | 99.32 | 99.32 | 99.21 | 99.34 | 99.34 | 99.53 | 99.6 | 99.74 |
|  | Clay | 60.49 | 59.23 | 63.41 | 68.01 | 64.39 | 63.55 | 63.94 | 67.3 | 63.39 | 68.34 | 69.63 | 70.5 |
| $NH_3$ | Embodiment 10 | 96.62 | 96.95 | 96.56 | 95.55 | 95.23 | 93.37 | 94.08 | 95.1 | 94.95 | 95.69 | 95.66 | 95.4 |
|  | Clay | 69.13 | 36.86 | 41.8 | 52.01 | 43.75 | 53.65 | 44.69 | 53.36 | 48.4 | 55.49 | 48.36 | 53.24 |
| $H_2S$ | Embodiment 10 | 96.87 | 97.33 | 96.84 | 97.5 | 97.2 | 97.38 | 97.82 | 97.14 | 98.02 | 97.56 | 96.09 | 96.51 |
|  | Clay | 60.24 | 59.5 | 56.99 | 67.75 | 68.59 | 66.44 | 71.02 | 71.31 | 73.38 | 74.32 | 69.61 | 74.7 |

The results of table 6 and table 7 show that the degradation rate of biochar loaded with nitrogen is significantly higher than that of biochar loaded with nitrogen and clay loaded with microorganism, especially in the early stage (within 30 days) of in-situ degradation of VOCs in landfill site by the above materials, mainly because the biochar modified with nitrogen can significantly promote the propagation and expansion of microorganisms decomposing VOCs In particular, in the early stage of loading microorganisms, the speed of microbial amplification of biochar modified with nitrogen is very fast, and its effect is much better than that of biochar modified without nitrogen. The reason is that the biochar modified with nitrogen has polarity, large specific surface area, and can absorb VOCs to provide nutrition for the loaded microorganisms.

Embodiment 12

As shown in FIG. 10-16, the results show that the degradation efficiency of the materials in embodiment 9 for TVOC, cvoc, ovoc, SVOC, AVOC, NH3 and H2S are 99.6%, 99.74%, 100%, 98.51%, 99.58%, 95.42% and 97.18%, respectively, while the degradation efficiency of clay for TVOC, cvoc, ovoc, SVOC, AVOC, NH3 and H2S are 66.54%, 66.70%, 70.90%, 59.78%, 65.18%, 50.06% and 67.82%, respectively. It can be seen that the material of embodiment 9 has good degradation effect on VOCs and inorganic odor. TVOC represents the total VOCs; cvoc represents the VOC containing chlorine; ovoc represents the VOC containing oxygen; SVOC represents the VOC containing sulfur; AVOC represents the VOC containing aromatics.

The invention claimed is:

1. A preparation method of in-situ efficiency degradation carbon based material of VOCs in landfill based on waste regeneration, which is characterized in that the following steps are included:
   S01: pretreatment of raw materials: air dry the agricultural and forestry wastes to a moisture content of 0.001 wt %~20 wt %, and crush them to a particle size of 0~50 mm with a grinder, Then mix the organic nitrogen as a modifier with the crushed agricultural and forestry wastes in a mass ratio of 1:50~1:10 to uniformly prepare the agricultural and forestry wastes mixed with nitrogen;
   S02: after 20-60 minutes of dry distillation at 300-600° C., the nitrogen doped agricultural and forestry wastes prepared in step S01 were rapidly cooled to prepare nitrogen rich biochar;
   S03: preparation of microbial rich nitrogen biochar: the microbial rich nitrogen biochar was prepared by mixing the nitrogen rich biochar obtained in step S02 and sewage sludge with water content of 90-98 wt. % in the proportion of 20:1-10:1 by weight; and
   S04: in situ degradation of VOCs in landfill site by microbial rich N-rich biochar: replace part of clay cover with microbial rich N-rich biochar obtained in step S03.

2. The preparation method as claimed in claim 1, which is characterized in that the agricultural and forestry wastes are selected from the group consisting of straw, wheat straw, bagasse, leaves, branches and weeds.

3. The preparation method according to claim 1, which is characterized in that the organic nitrogen modifier in step S01 is urea or amide.

4. The preparation method according to claim 1, which is characterized in that the sewage sludge in the step S03 is the activated sludge rich in microorganisms produced in the process of urban domestic sewage or industrial sewage treatment.

5. The preparation method according to claim 1, which is characterized in that the activated sludge contains microorganisms are selected from the group consisting of non methane nutrition bacteria, methane nutrition bacteria-i, methane nutrition bacteria-ii, aerobic heterotrophic bacteria, actinomycetes, fungi, sulfur oxidizing bacteria, and sulfate reducing bacteria.

6. The preparation method as claimed in claim 1, which is characterized in that the nitrogen mixed agricultural and forestry wastes in step S04 are uniformly prepared by mixing the organic nitrogen as modifier and the crushed agricultural and forestry wastes in the proportion of 1:50-1:10 by mass.

7. The preparation method as claimed in claim 1, which is characterized in that the nitrogen rich biochar rich in microorganism in step S04 replaces the clay covering layer.

* * * * *